Oct. 30, 1928.
M. D. DOMINGUEZ
WATER HEATER
Filed Aug. 15, 1927
1,689,521
3 Sheets-Sheet 1
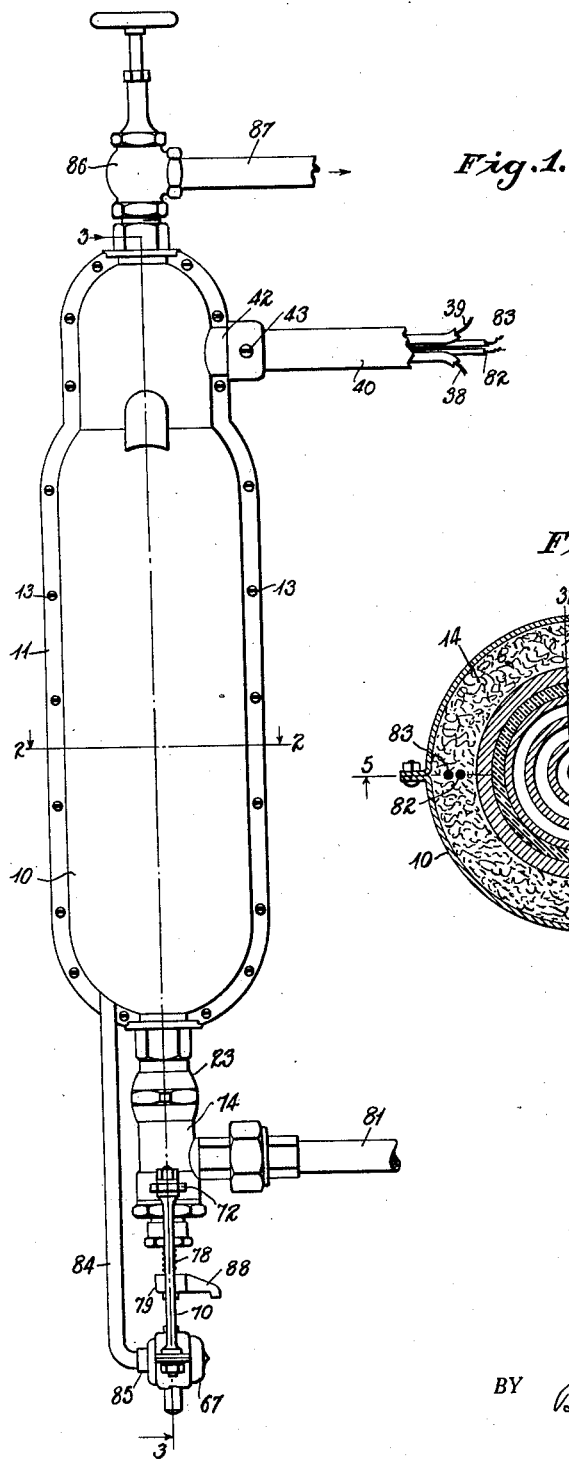
INVENTOR.
Manuel D. Dominguez
BY
ATTORNEYS Oct. 30, 1928.　　　　　M. D. DOMINGUEZ　　　　　1,689,521
WATER HEATER
Filed Aug. 15, 1927　　　3 Sheets-Sheet 2
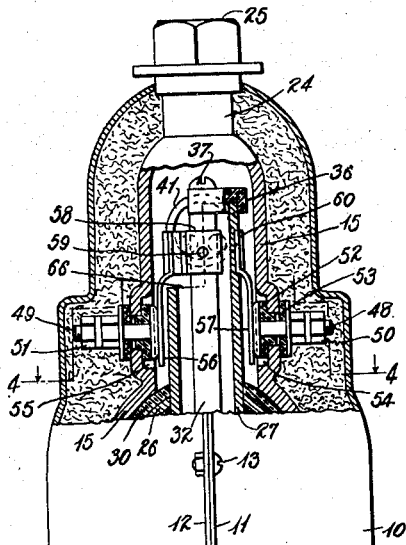
Fig. 3.
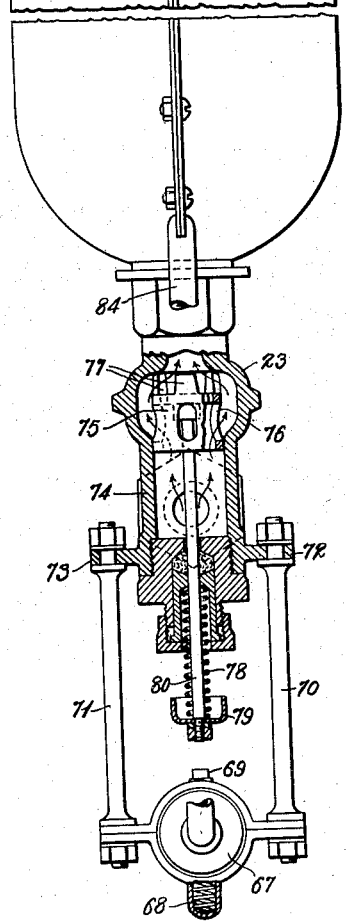
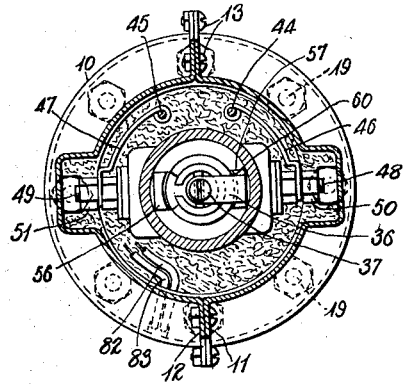
Fig. 4.
INVENTOR.
Manuel D. Dominguez
BY Brown & Phelps
ATTORNEYS Patented Oct. 30, 1928.

1,689,521

UNITED STATES PATENT OFFICE.

MANUEL D. DOMINGUEZ, OF NEW ORLEANS, LOUISIANA.

WATER HEATER.

Application filed August 15, 1927. Serial No. 213,020.

The invention relates to water heaters and has as an object the provision of a self-contained automatic water heater designed to heat water as fast as drawn from a faucet.

It is a further object of the invention to provide a water heater in which the water conducts the heating current through the body of the water.

It is a further object of the invention to improve generally upon the construction of water heaters of this type.

Further objects of the invention will appear from the following description when read in connection with the accompanying drawings showing an illustrative embodiment of the invention, and wherein:—

Figure 1 is a side elevation;

Fig. 2 is a horizontal section on line 2—2 of Fig. 1 upon an enlarged scale;

Fig. 3 is an elevation partly in section upon the scale of Fig. 2 broken away to reduce its length showing a switch operating valve in section;

Fig. 4 is a horizontal section on line 4—4 of Fig. 3; and

Figure 5:
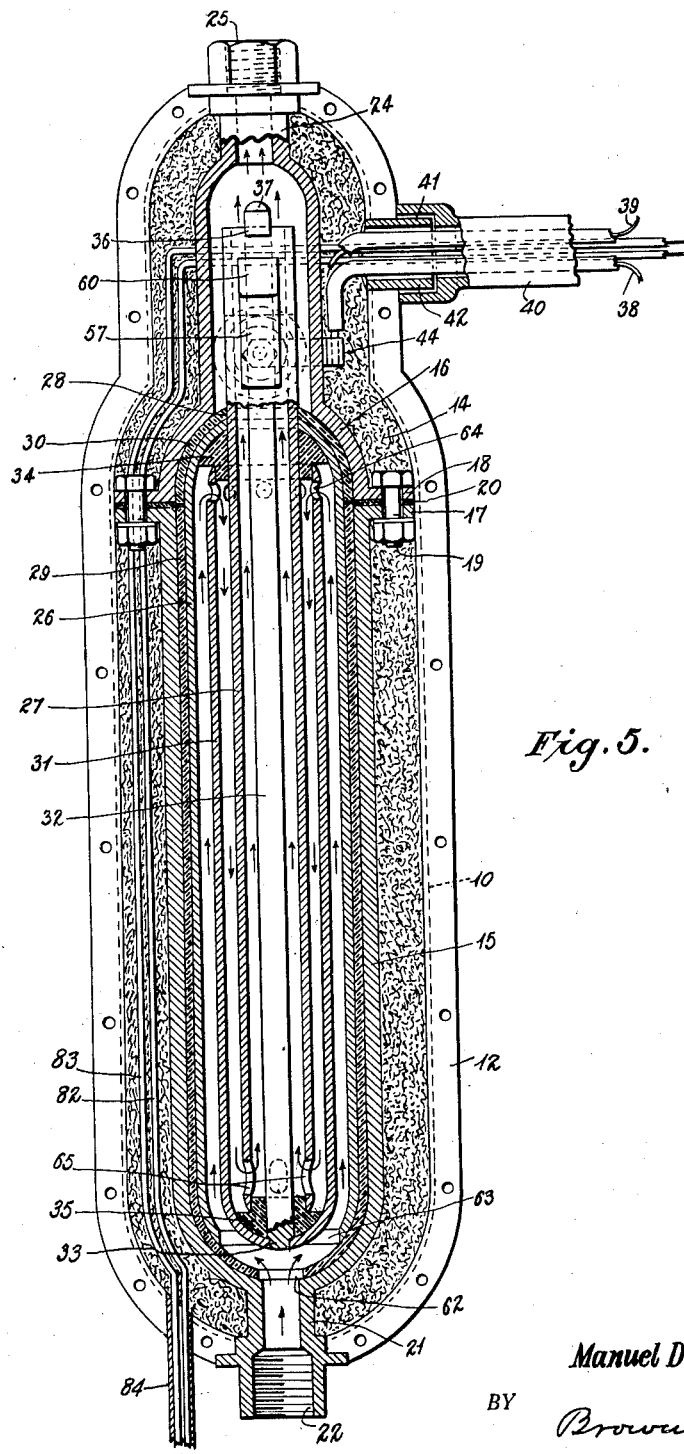
Fig. 5 is a vertical section on line 5—5 of Fig. 2.

As shown the device comprises a casing 10 desirably formed of longitudinal halves provided with flanges 11, 12 which may be secured together by means of screws 13 and which enclose the shell 15, that contains or encloses the current conducting elements between which the water to be heated flows.

Within the casing 10 and about the elements therein, there is shown heat insulating material 14.

To contain the water and the conducting elements there is shown a shell 15 having a removable portion 16 secured thereto as by means of annular flanges 17, 18 carried by the parts 15, 16 and secured together by means of screw bolts 19, a gasket 20 being provided to make the connection water-tight.

To conduct water to the device, the shell 15 is shown as provided with a neck 21 projecting through the casing 10 and provided with a screw-threaded socket 22 for connection with a valve chamber 23, shown in Figure 3 and to conduct the water from the portion 16 of the shell, the same is shown as provided with a neck 24 also projecting through the upper end of the casing 10 and provided with a screw socket 25 for connection of an outlet pipe.

To conduct current into the body of water flowing through the heater there are shown electrodes 26, 27, electrically connected at 28, the electrode 26 being in the form of a shell insulated from the shell 15 by means of insulating material 29, 30 so formed in two parts as to enable the assembling thereof over the parts enclosed thereby.

The remaining electrode is formed by means of a shell 31 and a central rod 32 in electrical connection at 33 at which point the rod 32 passes through an opening in the lower end of shell 31 and is secured thereto by upsetting or welding.

To preserve the spacing between shell 31 on the one hand and shell 26 and tube 27 on the other hand at the upper end of shell 31, there is shown an annular plug 34 of insulating material surrounding the tube 27 and having a shoulder with which the open end of the shell 31 telescopes. To preserve the spacing between the tube 27 and the shell 31 and the rod 32, there is shown a second annular plug 35 of insulating material having a shoulder over which the tube 27 telescopes. To preserve the spacing between the rod 32 and the top of the tube 27, there is shown a plug 36 of insulating material secured to the end of rod 32 by means of a screw 37, the plug 36 having a notch to receive the upper edge of the tube as shown in Figure 3.

To conduct current to the thus formed electrodes there are shown wires 38, 39 passing through a conduit 40 fitting over a plug of insulating material 41 received between outwardly swelled portions of the flanges 11, 12 as indicated in Figure 1 at 42, which plug of insulating material is clamped between the halves of the casing 10, and which conduit 40 is secured to the plug by means of a screw 43, the wires 38, 39 passing to the interior of the casing and having their ends engaging in cylindrical terminals 44, 45 of connection strips 46, 47, which strips are secured upon stud bolts 48, 49 respectively by means of nuts 50, 51, the stud bolts passing through the walls of the upper end of the shell 15 and insulated therefrom by packing material 52, 53, the heads of the bolts being received in cavities 54, 55 in said shell 15.

Current is conducted from the heads of bolts 48, 49 to the electrodes by means of spring contact blades 56, 57. The spring 56 is shown as carried by a bushing 58 passing about the rod 32 which may be secured therein as by means of pin 59. The contact 57 is shown as secured to the outer surface of tube 27 at 60.

To conduct water to the space between the shells 26 and 31, the insulating shell 29 is shown as provided with an opening at 62 and the shell 26 is left open at 63. Water thus entering the shell 26 passes upwardly in the space referred to and to the interior of shell 31 through openings 64 into the space between the shell 31 and the tube 27 then flowing downwardly passes to the interior of tube 27 through openings therein indicated at 65, then flowing upwardly passes out of the upper end of the tube which is cut away at its top for a short distance from its end as indicated at 66, Figure 3, from which point the water flows out through the neck 24.

To control the supply of current to the electrodes, there is shown a snap switch 67 of any wellknown form which may be urged to circuit closing position by means of a spring 68 and which may be thrown to open circuit by pressure upon a button 69. The switch is indicated as supported by means of rods 70, 71, bolted to ears 72, 73 carried by the cylindrical portion 74 of valve casing 23, which in turn is supported by screw threaded engagement with the socket 22.

To actuate the switch 67 to open the circuit therethrough when water is not flowing through the heater, there is shown a valve 75 reciprocating in cylinder 74 and having ports 76 through which the water may flow when in the position shown in Figure 3, also having spaced projections 77 between which the water may flow to the neck 21. When the flow of water through the heater is checked, as by means of the closing of a faucet or other valve, the valve 75 will be forced downwardly by means of spring 78 acting against a cup 79 carried by valve stem 80 to thus close the port 76, and to thereby cause the end of the valve stem to press upon button 69. When the faucet is again opened, pressure of the water in the inlet pipe 81 will open the valve and permit spring 68 to close the circuit to the switch.

The circuit to the switch is formed by means of wires 82, 83 passing through conduit 40 and downwardly within the casing 10 emerging from said casing through the conduit 84 which communicates with the switch housing at 85 as indicated in Figure 1. The purpose of this circuit and snap switch is to operate a remote control switch (not shown).

In operation the water will follow the tortuous path already indicated between the oppositely connected electrodes flowing through the length of the heater three times and the current passing through the water will heat the same by virtue of its electrical resistance.

It is desirable to provide a shutoff valve 86 at the top of the heater to control the flow of water to the outlet conduit 87 as indicated in Figure 1.

Should there be leakage about the valve stem 80, the water will be caught in the cup 79 and carried off through a trough-like extension 88 projecting therefrom so as to drip clear of switch 67.

The heater of the present invention will automatically heat water when any faucet connected with the outlet is opened, the current being automatically turned on when the water begins to flow. By virtue of the tortuous path through which the water passes the water will be thoroughly mixed so as to be evenly heated and will not flow with portions cooler than other portions thereof, and the passage of the current through the water in the process of heating the same would result in sterilizing the water.

The parts are readily detachable, and thereby are made accessible to permit the taking out of the electrodes for the purpose of cleaning the same when necessary, after which the parts may readily be reassembled and replaced. The conductors are all well protected and the device in itself is compact, neat in appearance and inexpensive in construction, and the device is practically indestructible.

Minor changes may be made in the physical embodiment of the invention within the scope of the appended claims without departing from the spirit thereof.

I claim:

1. An electrical water heater comprising, in combination, a central electrode connected to one side of an electric circuit, a tube surrounding said first named electrode and having its walls spaced therefrom connected to the other side of the circuit, a shell rigidly and electrically connected to said first named electrode surrounding said tube, a second shell rigidly and electrically connected to said tube and surrounding said first named shell, said shells annularly spaced apart, insulating means to preserve the spacing and alignment of said tube and shells, said tubes having an opening for passage of water at one end thereof, said last named shell having an opening for passage of water at its end opposite said first named passage, said first named shell and said tube also having openings for passage of water at opposite ends whereby to provide a tortuous path for flow of water through the spaces between opposite electrodes.

2. An electrical water heater comprising, in combination, a casing, a water-tight shell housed therein and having means at its opposite ends for connection of water pipes, a central electrode connected to one side of a circuit, a plurality of annularly spaced nested shells, the inner shell thereof surrounding and spaced from said central electrode and the outer thereof electrically insulated from said first named shell, means for connecting one side of one of said nested shells with the opposite side of the circuit, alternately spaced shells and central electrode electrically connected together, means permitting the passage of water from one end of said first named shell to one of said spaces and from the other thereof to the water connection at the other end of the first named shell, the spaces in said shells provided at alternate ends with means for the passage of water whereby water flowing through the device must follow a tortuous path and conduct electricity through its body throughout the said path.

3. An electrical water heater comprising, in combination, a water-tight shell formed in two parts by a transverse joint, means for connecting water pipes to opposite ends of said parts, a plurality of annularly spaced nested shells within said first named shell, said nested shells closed at opposite ends and alternate shells thereof electrically insulated from the adjacent shells, means for connecting alternate shells to the two sides of an electric circuit, the outer space between said shells having means for passage of water from one of said pipe connections and the opposite end of the inner space having means for passage of water through the remaining pipe connection, alternate ends of the intermediate spaces having passages of water from space to space whereby water passing through the device follows a tortuous path and acts as a conductor of current throughout its flow.

4. An electrical water heater comprising, in combination, a water-tight shell, electrical terminals mounted in said shell insulated therefrom and exposed upon the interior of the shell, a central electrode having a contact plate in connection with one of said electrodes, a plurality of annularly spaced nested shells, the inner thereof surrounding and spaced from said central electrode and having a contact plate in contact with the remaining electrode, means for connecting alternate shells with said first named electrode and with said inner shell respectively, the outer of said shells having means for passage of water to the outer annular space and the inner shell having means at its opposite end for passage of water from the space between the same and the inner electrode, alternate ends of the intermediate spaces having passages for flow of water between said spaces whereby water flowing through the device follows a tortuous path and acts as a conductor of electric current between said shells.

MANUEL D. DOMINGUEZ.